United States Patent [19]

Adamson et al.

[11] Patent Number: 5,423,685
[45] Date of Patent: Jun. 13, 1995

[54] CPR TRAINING MANIKIN

[76] Inventors: Ian A. Adamson, 1352 Elizabeth St., Denver, Colo. 80206; Leonard P. Quercioli, 823 9th St., Golden, Colo. 80401

[21] Appl. No.: 80,983

[22] Filed: May 28, 1993

[51] Int. Cl.⁶ ............................................. G09B 23/28
[52] U.S. Cl. ................................................... 434/265
[58] Field of Search ........................ 434/265, 267, 262

[56] References Cited

U.S. PATENT DOCUMENTS

| | | | |
|---|---|---|---|
| 3,562,925 | 2/1971 | Baermann et al. | 454/265 |
| 3,872,609 | 3/1975 | Smrcka | 434/265 |
| 3,994,075 | 11/1975 | Kohnke | 434/265 |
| 4,001,950 | 1/1977 | Blumensaadt | 434/265 |
| 4,619,617 | 10/1986 | Rice | 434/265 |
| 4,801,268 | 1/1989 | Kohnke | 434/265 |
| 4,802,857 | 2/1989 | Laughlin | 434/265 |
| 4,850,876 | 7/1989 | Lutaenko et al. | 434/265 |
| 4,984,987 | 1/1991 | Brault et al. | 434/265 |
| 5,055,052 | 10/1991 | Johnson | 434/265 |
| 5,256,070 | 10/1993 | Garth et al. | 434/265 |

FOREIGN PATENT DOCUMENTS 4201777  7/1993  Germany ........................ 434/265

OTHER PUBLICATIONS

Laerdal, Trade Show Presentation, "Laerdal Family CPR Trainer", presented Seattle, Wash., Apr. 13, 1992.

*Primary Examiner*—Gene Mancene
*Assistant Examiner*—Jeffrey A. Smith

[57] ABSTRACT

A disposable manikin with a disposable airway, lung and face shield, is used for training people in the art of cardiopulmonary resuscitation (CPR), Heimlich Maneuver and Abdominal Thrust Maneuver, yet is low cost, recyclable and durable. The manikin comprises detachable parts, including a torso, a neck, a head, a chest compression spring, an airway with built in face mask and built in elements to interconnect these parts. All components preferably are made from lightsweight, low-cost and durable materials.

18 Claims, 4 Drawing Sheets

CPR TRAINING MANIKIN

BACKGROUND OF THE INVENTION

1. Field of Invention

This invention relates to manikins used for training people in the art of cardio pulmonary resuscitation (CPR), including mouth-to-mouth ventilation and external cardiac massage, Heimlich Maneuver and Abdominal Thrust Maneuver.

2. Description of the Prior Art

CPR training manikin systems include a facsimile of the human body, in particular the torso, head, neck and internal features to simulate an airway and chest cavity protecting the heart.

Instruction in the art of CPR involves teaching both theory and practice. In order to achieve the practical application of this art, a person or facsimile thereof must be used. Several concerns exist with using people for training, namely the high risk of cross contamination of disease during ventilation and the likelihood of inducing cardiac seizure during external cardiac massage. As a result there is an almost universal use of human facsimiles, in the form of training manikins, which enable these techniques to be used safely and effectively.

There are a number of important physical features and functions of the human body that are essential for the application of CPR techniques. These features and functions are represented on a CPR training manikin and include anatomical features on the torso to facilitate correct hand placement for cardiac massage, a resilient chest that can be compressed with appropriate resistance during cardiac massage and will expand during ventilation to show the effect of breathing, an articulated head and neck that allows correct head tilt and chin lift to open the airway for ventilation, a sanitary face shield/windpipe and lung (airway) that prevent cross contamination of disease between students.

Several systems and materials have been employed to simulate the desired features and functions of a human body in CPR manikins. Typically these have been aimed at accurately reproducing physical detail as well as functional anatomy. A variety of mechanisms and electronics have been used as feedback mechanisms for the students and teachers of CPR and have been patented in some instances. Typically these manikins are sophisticated in nature and consequently are expensive to buy and to maintain. Further, most manikins are very heavy and difficult to carry around. More recently the trend has been towards the use of less expensive, lighter and simpler, manikins. These have the advantages of low cost, low maintenance, low weight transportability and simplicity. U.S. Pat. No. 4,984,987 describes a manikin of this type.

In U.S. Pat. No. 4,619,617 a device is described that is not intended to be like a manikin, but uses a foam block that is meant to simulate a person's chest. Unlike the present invention, the foam block is pressed on directly and as a consequence does not have the feel of a persons chest with a sternum under the skin. Neither is the block intended to rebound like a persons chest, which is a requirement of the present invention.

Many airway assemblages have been developed to represent the human airway system, which simultaneously reduce transmission of disease. Some manikins utilize re-usable face shields, lung and airway which are either removed for cleaning or are wiped clean with a sterilizing solution. Other manikins use a disposable lower airway and lung and cleanable and/or removable face shield. All the existing systems require clean-up and the associated cleaning fluids and cleaning equipment.

In U.S. Pat. No. 4,802,857 a device is shown that is intended to be used as a hygienic face shield for use on CPR dummies. This is not a complete airway system as described in the present invention, but requires the existing airway passages and lung of a CPR manikin.

In U.S. Pat. No. 5,055,052 a device is shown that simulates the respiratory tract of a model for practicing artificial respiration. This device is an inflatable balloon that is resilient in nature and requires the use of constraining elements to restrict inflation to pre-determined regions. The present invention uses a non-resilient bag that does not require such constraint.

Cardiac arrest is the single largest killer in today's western society, however death from this event has been proven preventable through knowledge of correct CPR training if applied within the first few minutes of arrest. In most instances this can be achieved by a person close to the victim and this is typically a loved one in the home. The applicants believes that many tens or even hundreds of thousands of deaths can be prevented each year if a manikin is available that is very low cost and accessible to the home user.

Further the applicants believes that the manikin should be environmentally friendly and made from recycled and recyclable materials.

It is also believed that there is a need for a very low cost and fully disposable airway system that totally eliminates the possibility of cross contamination of disease and clean-up on manikins intended for multiple use.

OBJECT OF THE INVENTION

It is an object of this invention to provide a very inexpensive, ultra-light weight, disposable, environmentally friendly manikin to be used for class instruction and self (home) training of basic CPR life support.

STATEMENT OF THE INVENTION

According to the invention, there is provided a CPR training manikin for training a user including:

a torso element that is hollow and resilient, a neck element that is removably connected to the torso element, a head element that is removably connected to the neck element, is hollow and has a mouth opening to allow ventilation, a disposable airway element in the form of an elongate bag having an open end and a closed end, said airway element being configurable to cover the face of the head element at its open end, to pass through the mouth into the head element, to pass through the head element and the neck element into the torso element at its closed end, and a compression element that fits within the torso element and under or over the airway element to accept external compression forces by the user.

The torso element is a simple casing that represents the human torso and may have visual and/or contoured features that describe the necessary references to allow correct hand placement for performing external cardiac massage, Heimlich maneuver and abdominal thrust maneuver. It is desirable for the torso element to be flexible enough to allow for displacement during application of the above CPR techniques and for displacement during ventilation. It is preferred that the material used for fabrication of the torso element is a flat sheet of a material that is light weight, durable, semi-rigid, low cost, environmentally friendly and lends itself to mass production techniques. It is obvious from reading the specifications that there are many materials and manufacturing methods meeting these criteria, however the materials of preference are corrugated fiberboard or corrugated plastic board. The un-assembled torso element is preferably a flat sheet that can be folded to form the torso casing and can be conveniently stored or transported in large numbers. Slots and tongues may be used to position the folded sheet. Hook and loop connectors (Velcro ®), double sided tape, folded tabs, or other mechanisms can be used to secure the sheet in place. The front and back sides of the torso element provide a gap that allows insertion of the compression element and airway element. It is appropriate to use scoured lines on the sheet to facilitate folding in the desired places. It is also appropriate to print text or graphics on the sheets to provide instructions and information to the user. Slots and/or holes may provided to accept tabs on the neck element to allow connection to the torso element in a way that permits articulation for head-tilt, chin-lift to open the airway for ventilation. Fixation of these elements may be provided by any appropriate mechanism such as those stated above. In some embodiments, the torso element shall have provided a handle that makes it convenient to carry the other manikin elements and other desired articles within the torso elements casing.

The neck element is a simple shell that provides a representation of the human neck and may have visual or contoured markings to show anatomical features, such as the carotid artery, that facilitate the application of CPR techniques. The neck element may be similar in material composition and manufacturing technique to those of the torso element. It is preferable that it is made of a corrugated board to ensure cost effectiveness and quality production. The neck element may be provided with tongues, slots, tabs, or other connecting mechanisms, as described for the torso element, to allow connection to the torso element and to the head element. The neck element, in some cases, may be a part of the head element or the torso element.

The head element is a simple shell that provides a representation of the human head and may have on it visual or contoured markings to show anatomical features that assist in the application of CPR techniques. The head element may have an element of its underside that blocks off the airway when the head is in the relaxed, non-extended position. When the head is tilted back, the underside element lifts off the airway and allows ventilation of the airway. The head element may be similar in material composition and manufacturing technique to those of the torso element. It is preferable that it is made of a corrugated board to ensure cost effectiveness and quality production. The head element may be provided with tongues, slots, tabs, or other connecting mechanisms, as described for the torso element, to allow connection to the neck element. It is preferable that the back of the head element be open to allow ease of assembly and insertion of the airway element. The front of the head element, on its face, may have provided a hole to represent the mouth opening and allow the airway element to be inserted through it. In some embodiments, the head element shall be of a size that permits it to fit within the torso element to reduce the volume of the manikin parts and protect them during storage and transport.

The compression element may be a simple foam block or other light weight, resilient material that is adapted to fit into the casing of the torso element. It is anticipated that the compression element can be manufactured by many different means and with many different materials. It is preferred that it takes the form of a low density, compressible foam cube, with sufficient resilience to return to its original shape after compression during CPR techniques and sufficient compressive strength to provide appropriate resistance to application of CPR techniques. The compression element may be so designed that it can slide between the front and back panels of the torso element and positioned appropriately for external cardiac massage, Heimlich maneuver or abdominal thrust maneuver. There should be sufficient interference between the torso element and the compression element that it is held securely enough in place for the above techniques to be performed.

The disposable airway element may be a simple plastic bag. It may be inserted through the mouth opening in the head element, beneath the underside element of the head element and into the torso element, between the compression element and the front or back panel of the torso element. The open end of the airway element may be spread open, over the face of the head element to act as a sanitary face shield. In some embodiments, the airway element will be a light weight plastic bag which is rectangular in shape and has the open end along one of the short sides of the bag. The long side of the bag will be approximately six times the length of the short side. During application of CPR techniques, the neck element connects the head element and the torso element, the disposable airway element passes through the mouth, under the neck element and into the torso element, and the compression element fits inside the torso element and over or under the airway element. The assembled manikin will respond to CPR techniques with an airway that must be opened with a head tilt, a chest that rises when ventilation of the airway is performed, and elastic resistance to compression of the torso. CPR techniques are performed on the assembled manikin in the manner prescribed by the appropriate literature or personnel.

BRIEF DESCRIPTION OF THE DRAWINGS

In the figures which describe the preferred embodiment of this invention.

DESCRIPTION OF THE PREFERRED EMBODIMENTS

Figure 1:
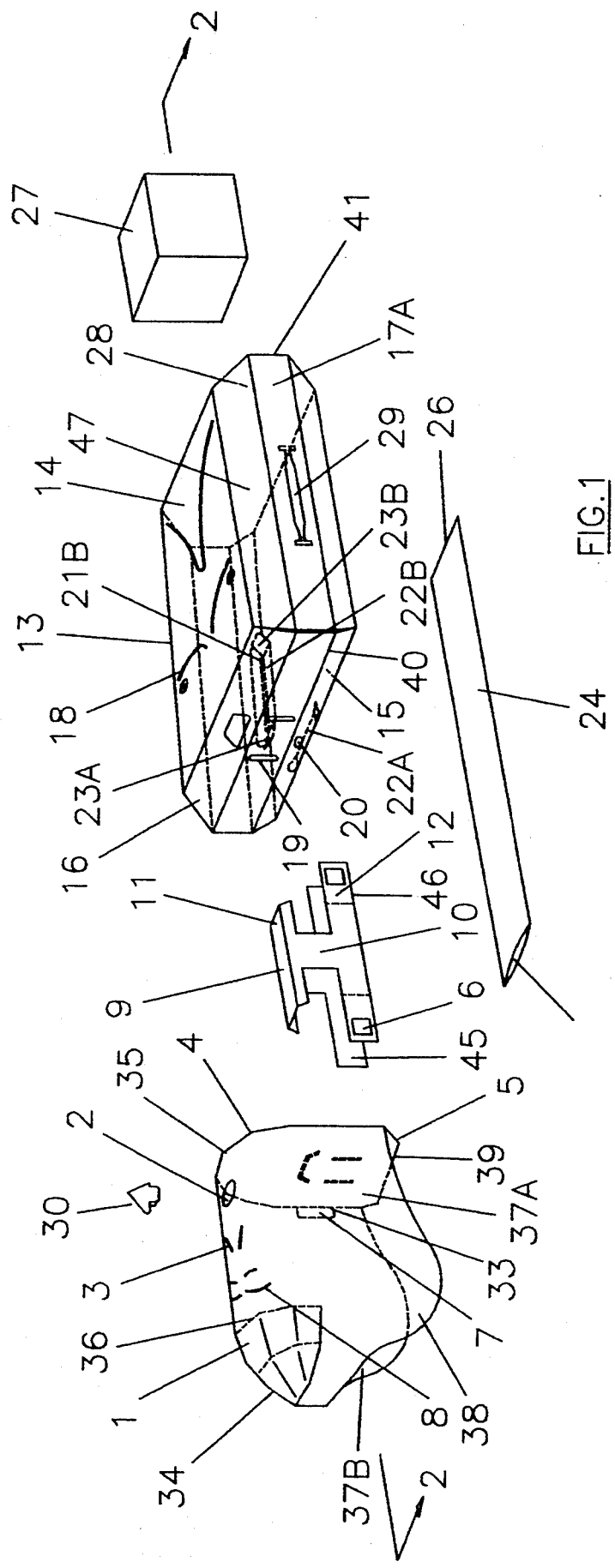
FIG. 1 is an exploded view of the preferred embodiment of the invention.

The present invention will now be explained with reference to the drawings, in which the same reference characters are used to designate like elements. The manikin illustrated in the drawings comprises a head element (1), having a top portion (34) and a bottom portion (35), which is constructed from a corrugated paperboard sheet, die cut and folded to form the general shape and features of a human head, including a frontal face panel (36), two head side panels (37A and 37B) and a back portion (38). Openings in the face panel (36) are provided for the mouth aperture (2) and nose piece slots (3). The underside of the head has a section of the neck attachment panel (5) that, at its back end (39) closes off the airway against the surface (not shown) supporting the manikin when the head is not tilted back. Openings in the neck attachment panel (5) are provided for the neck attachment slots (4). A hook and loop (Velcro®) connector (6), and head slot (7) and head flap (33) are provided to hold the folded head in shape. The head element (1) is colored a skin tone and is printed with facial features (8). The nose element (30) is held in place by interference in the nose slots (3). The neck element (9) is a corrugated paperboard sheet having a top end (45) and a bottom end (46), which is die cut and folded to form the general shape and features of a human neck. Folds (10) in the neck provide tactile and visual indicators of the carotid pulse grooves for location of the carotid artery. The neck is provided with tabs (11) and flaps (12) that insert into the head element (1) and torso element (13) to secure these elements together. The flaps (12) have hook and loop connectors provided to secure the assembled elements.

The torso element (13), having a top portion (40) and a bottom portion (41), is constructed from a corrugated paperboard sheet, die cut and folded to form the general shape and features of a human torso. When folded, it has a frontal chest panel (14), a back panel (15), a shoulder panel (16) and two side panels (17A and 17B), which surround an inner cavity (47). The chest panel has printed on it anatomical features (18) representing the pectoralis major muscles, nipples, distal borders of the rib cage and xiphoid fossa in the sternal notch. These provide landmarks for location of the hands during external cardiac massage, Heimlich maneuver and abdominal thrust maneuver. The material used to make the torso element (13), the head element (1) and the neck element (9), is a 275 lb burst, B flute corrugated paperboard, skin colored and the anatomical features over printed in red. The mechanical strength and stiffness of the folded torso element (13) gives the assembled structure sufficient strength to be self supporting and to contribute to the resistance of a cardiac compression and to ventilation. The folded torso element (13) is shaped to house the compression element (27) with a slight interference fit that ensures the torso element (13) and compression element (27) remain together during use and transport. The shoulder panel (16) has shoulder panel slots (19) that accept neck flaps (12) and a neck tab (11) to connect the torso element (13) and the neck element (9). A windpipe aperture (20) is provided for the airway element (24) to pass from the interior of the torso element housing (13) to the neck element (9). Two torso slots (21A and 21B) are provided to correctly locate the folded shoulder panel (16) and back panel (15) against the frontal chest panel (14) using the two torso tabs (22A and 22B). Torso flaps (23A and 23B) are provided to fix the panels in position and allow multiple assembly and disassembly of the torso element (13) during use. A plastic carrying handle (29) is provided on the side of the manikin to facilitate easy transport of the manikin and other materials such as instruction card, training literature and airway elements (24).

The disposable airway element (24) is a plastic bag 4 inches wide by 26 inches long which can be adjusted in length to simulate different lung volumes of possible victims. The open end (25) is designed as a built in face shield (42).

The compression element (27) is a cube of low density polyurethane foam, with an edge dimension just larger than the inside height of the torso element to provide a slight interference fit. This serves to hold the compression element (27) in place by friction. The compression element (27) has a density and resilience sufficient to accurately simulate the compression force and mechanical response of a human chest during cardiac compressions.

Figure 2:
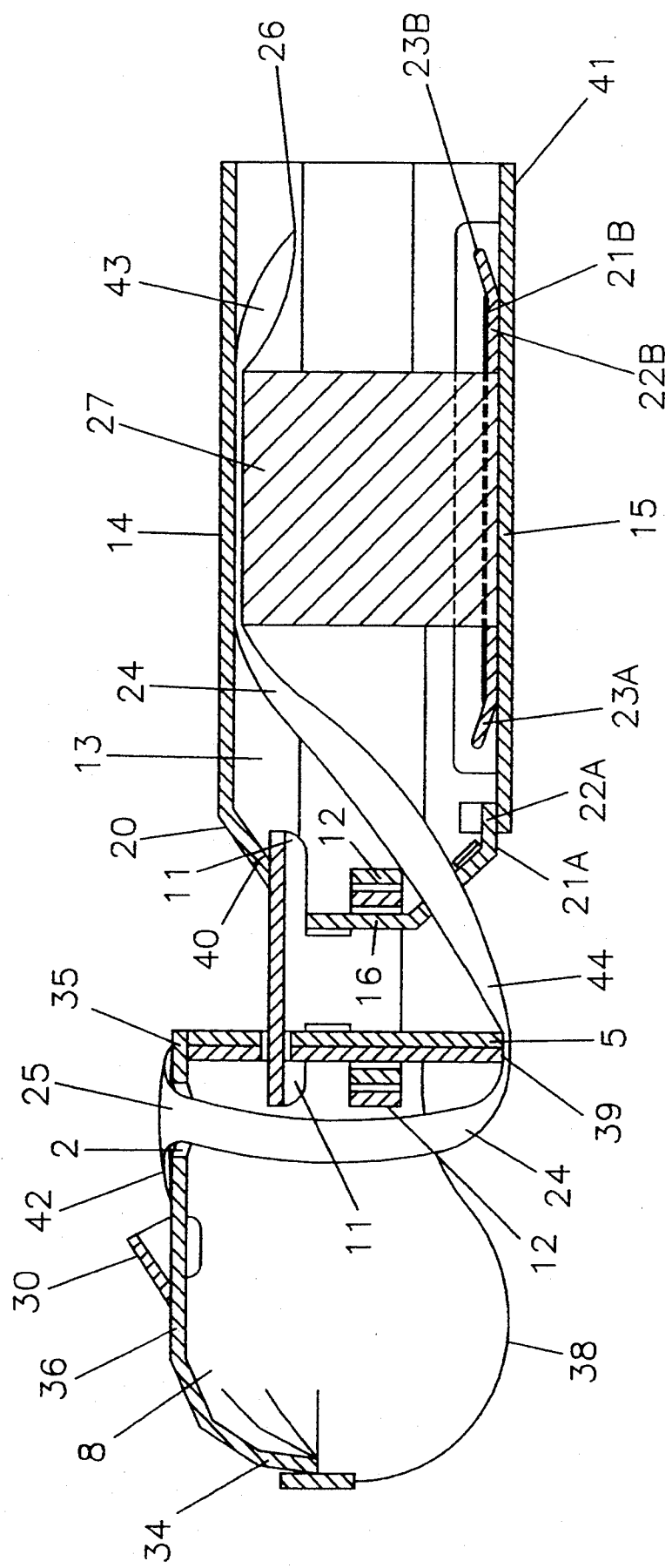
FIG. 2 shows a sectional view of the assembled manikins preferred embodiment.

FIG. 2 shows the assembled manikin in section view. On the torso element (13), the torso tabs (22A and 22B) insert into the torso slots (21A and 21B, respectively) and are secured with torso flaps (23A and 23B). The flaps (12) and tabs (11) of the neck element secure the head element (1) to the torso element (13). The disposable airway element (24) passes between the top or bottom of the compression element (27) and the inside surface of the frontal chest panel (14) of the torso element. It passes through the windpipe aperture (20), under the lower portion of the head element (2), the neck attachment panel (5), through the mouth hole of the head element (2) and the open end (25) is spread over the face of the head element (2). The closed end (26) of the airway element (24) is located in the torso element (13), distal to the compression element (27) to simulate the operations of a lung (43). The airway element (24) extends from the face shield (42), through a windpipe (44), to the lung (43).

The operation of the assembled manikin, FIG. 2, is defined in recommendations by the American Medical Association, for training in basic CPR, detailed in the Journal of the American Medical Association (JAMA), and recognized by the emergency medical industry in the United States.

Abdominal thrust maneuver may be performed by first sliding the compression element (27) to the open end (28) of the torso element (13) and thrusting down on the frontal chest panel (14), below the illustrative anatomic features (18) depicting the ribs, as recommended by emergency medical authorities.

Replacement of the airway element (24) is done by pulling the closed end (26) and sliding it out of the bottom of the torso element (13). A new airway element (24) is replaced in the same position as the old one.

Figure 3:
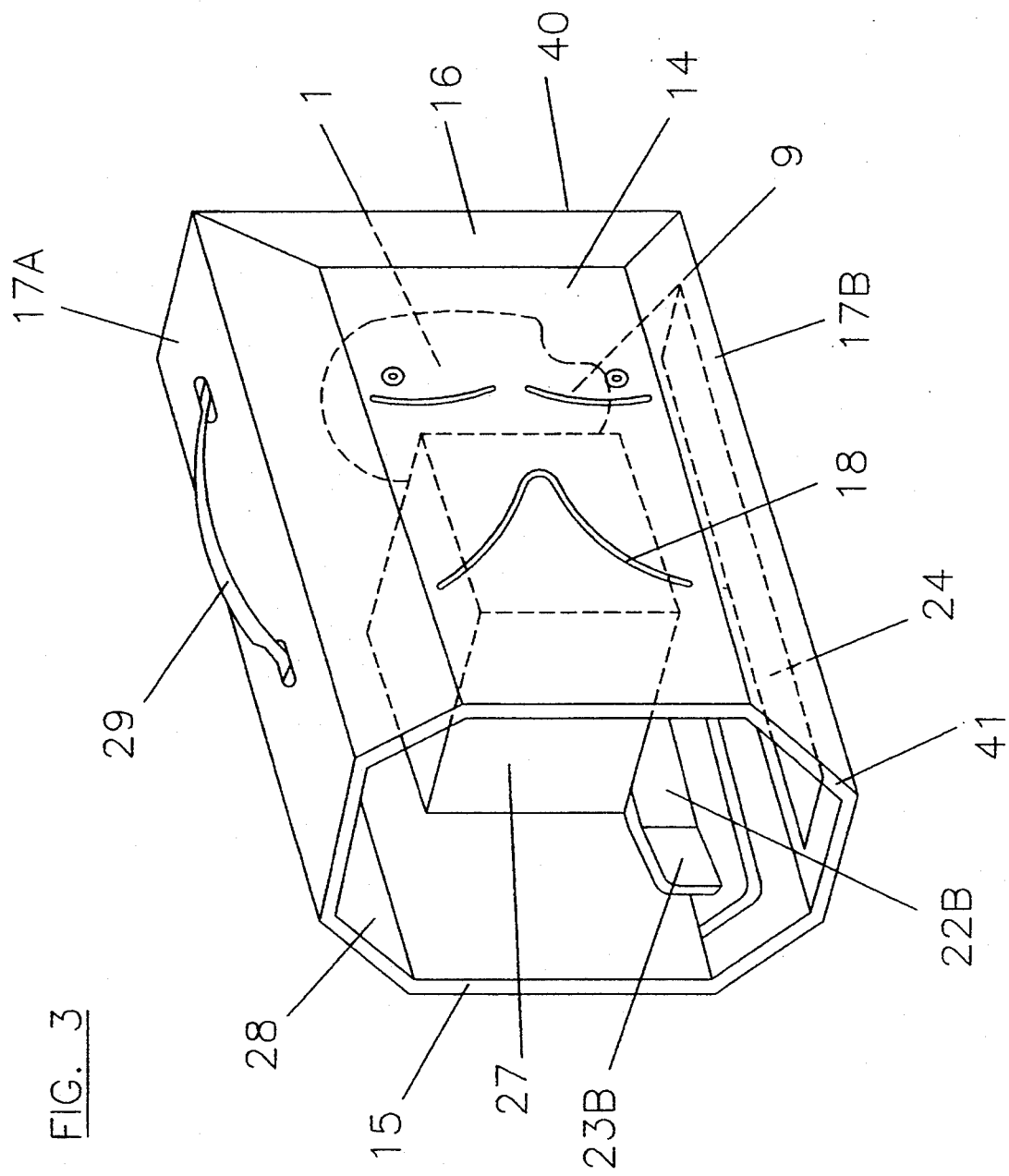
FIG. 3 shows a view of the preferred embodiment of the torso element used as a carrying case for the other elements for ease of transport and storage.

FIG. 3 shows the manikin torso element (13) used as a carrying case for the other manikin elements and any other materials that the user may want to keep with the manikin. To use the manikin as a carrying case, the compression element (27) is removed from the open end (28) of the torso element (13) and the head element (1), neck element (9), spare airway elements (24) and other material is placed inside the torso element (13). The compression element (27) is then placed back into the torso element (13) open end (28) and holds the other elements and material inside the torso element (13). The carrying handle (29) is located on the side of the torso element (13) to facilitate easy transport of the manikin, manikin parts and other material. The torso element used in this way also serves to protect the other manikin elements and material carried within.

Figure 4:
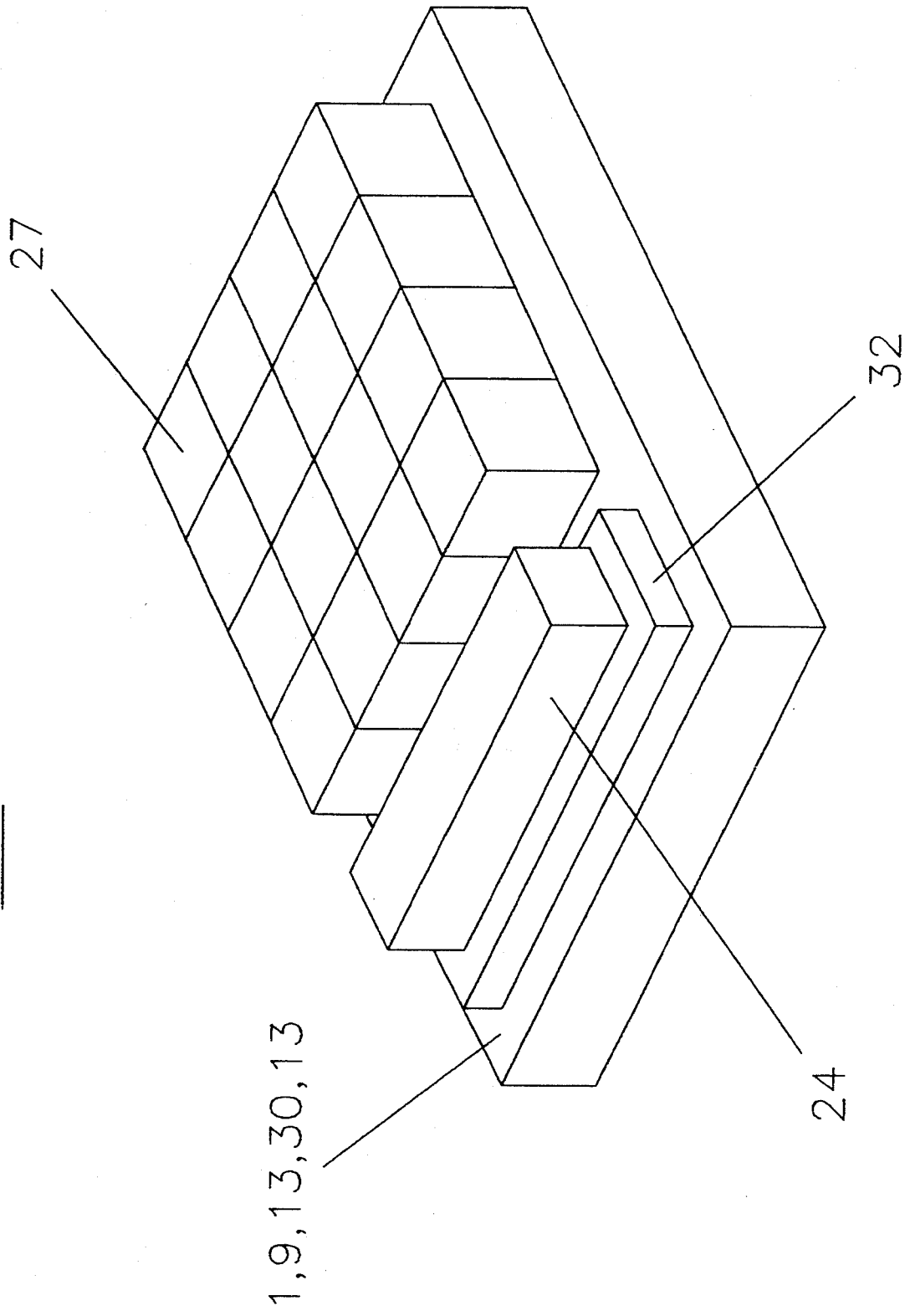
FIG. 4 shows how the unassembled elements can be arranged for transportation in multiple quantities.

FIG. 4 shows the un-assembled manikin elements can be transported in multiple quantities. The head elements (1), neck elements (9), torso elements (13) and nose elements (30) are die cut from single sheets of corrugated paperboard (31) and may be conveniently stacked in quantities of two or more. Multiple airway elements (24), compression elements (27) and literature (32) may be placed on top of the paperboard (31).

It will be appreciated by people familiar with the art, that elements and components may be joined, separated or varied while remaining within the scope of this invention. For example, the description of the foregoing embodiment discusses various tabs, slots and flaps for connecting and configuring each manikin elements and for interconnecting the various elements. It is understood that the function of the tabs, loops and slots may be performed by various other mechanical connectors that are known in the art, such as Velcro ® hook and loop connectors, double sided tape, folded tabs, clasps, snaps, buttons or other mechanisms.

The embodiments of this invention in which exclusive property and privileges are claimed are as follows:

1. A CPR manikin comprising in combination:
   a head element including a folded semi-rigid board that is disposed with mechanical attachments fashioned from the board to hold it in shape and having a front portion with a face and a mouth opening and an open back portion;
   a neck element including a folded semi-rigid board that is disposed with mechanical attachments fashioned from the board to hold it in shape and that is adapted to be fastened to the head element;
   a torso element including a folded semi-rigid board that defines a frontal chest panel and a back panel containing an internal cavity, said torso element being disposed with mechanical attachments fashioned from the board to hold it in shape and that is adapted to be fastened to the neck element;
   a compression element that fits with interference in the cavity of the torso element between the frontal chest and back panel, and which provides a resilient resistive force between said panels; and
   a disposable airway element having an open end and a closed end, adapted to fit with its open end through the mouth of said head element, with the open end spread as a face shield portion over the face of said head element and the distal portion positioned into the cavity of said torso element, said frontal chest panel and said back panel being disposed in parallel planes that are generally horizontal and positioned on a flat surface during use, and are separated by said compression element, and said airway element being held in place by friction between said compression element and said frontal chest panel of said back panel.

2. A manikin adapted to be placed on a supporting surface for practicing CPR compression and ventilation techniques, the manikin comprising in combination:
   a head element having a top portion and a bottom portion, said head element consisting of a sheet of semi-rigid material being folded into a three dimensional form and having a frontal face panel with a mouth aperture, two side panels folded from opposing sides of said face panel, a neck attachment panel folded from the bottom portion of said head element, and a back portion that is at least partially open, a back end of said neck attachment panel being adapted to rest on the supporting surface while in use;
   a torso element having a top portion and a bottom portion, said torso element consisting of a sheet of semi-rigid material being folded into a three dimensional form and having a frontal chest panel, two side panels folded from opposing sides of said chest panel, a shoulder panel folded from the top portion of said frontal chest panel, and a back panel, said shoulder panel having a windpipe aperture;
   a neck element consisting of a sheet of semi-rigid material, said neck element being removably attached to each of said bottom portion of said head element and said top portion of said torso element;
   a disposable airway element in the form of an elongated bag having an open end and a closed end, said airway element being removably positioned within the manikin, said airway element extending at said airway element closed end from the bottom portion of said torso element, through said neck element, to said head element at said airway element open end; and
   a resilient compression element that is frictionally held at selectable positions between the frontal chest panel and back panel of said torso element.

3. A manikin in accordance with claim 2, wherein said disposable airway element includes a face shield portion at its open end, a lung portion at its closed end and a windpipe portion extending from the face shield portion to the lung portion, said airway element being adapted to be positioned within the manikin to extend at said airway element closed lung portion from the bottom portion of said torso element, through said torso element lateral to said resilient compression element, through the windpipe aperture of said torso element shoulder panel, through said neck element, between the supporting surface and the back end of said head element neck attachment panel, and through the mouth aperture of said face panel, the open face shield portion of said airway element partially covering the face panel of said head element.

4. A manikin in accordance with claim 3, wherein said disposable airway element is several times longer than it is wide and said airway element open end is on a short side.

5. A manikin in accordance with claim 2, wherein said torso element frontal chest panel and said torso element back panel are adapted to be positioned generally horizontally during use and said torso element side panels and said torso element shoulder panel are adapted to deform during compression and to recoil otherwise.

6. A manikin in accordance with claim 2, wherein said torso element shoulder panel and said torso element side panels further comprise tabs and flaps for secure coupling to said torso element back panel at adjacent positions.

7. A manikin in accordance with claim 2, wherein said torso element back panel and said torso element frontal chest panel have smooth and flat surfaces to allow the compression element to slide therebetween.

8. A manikin in accordance with claim 2, wherein said compression element comprises a resilient block that deforms on application of a compressive force and reforms on release of a compressive force, said compression element having flat surfaces that allow it to slide between said torso element frontal chest panel and said torso element back panel.

9. A manikin in accordance with claim 2, wherein said neck element has a top end and a bottom end and includes tabs for coupling said neck element to said torso element and to said head element at each of the bottom and top ends, respectively, said torso element shoulder panel includes slots for receiving the bottom end tabs of said neck element and said head element neck attachment panel includes slots for receiving the top end tabs of said neck element, said tabs and slots being adapted so that when said head element is tilted back, said head element neck attachment panel is lifted off the supporting surface, thereby opening said airway element.

10. A manikin in accordance with claim 2, wherein said torso element frontal chest panel includes illustrative features depicting an outline of lower ribs, a sternal notch, nipples and pectoralis major muscles.

11. A CPR manikin comprising in combination:
a folded torso element having a frontal chest panel, a back panel, a shoulder panel and two side panels containing an inner cavity, said frontal chest panel with printed and contoured markings to represent a sternal notch, a lower border of ribs, pectoralis major muscles and nipples, one of said side panels being adapted for connecting a carrying handle, said shoulder panel having slots for receiving tab connectors, and said back panel being adapted to hold said torso element in shape;
a folded head element having a frontal face panel, two side panels, a bottom neck attachment panel, an open back and a mechanical connector to hold the shape of said head element, said face panel having printed features that represent human facial features and having a mouth opening, said neck attachment panel having slots for receiving tabs,
a neck element having tabs that couple to slots on said torso element shoulder panel and tabs that couple to slots on said head element neck attachment panel, said tabs being adapted to hold said torso element and said head element together and to allow said head element to tilt back, said neck element having folds that represent a pulse groove for location of a patient carotid pulse;
a compression element adapted to be positioned within the cavity of said torso element in an interference fit between the frontal chest and back panel of said torso element thereby holding said compression element in position by friction forces, said compression element being a resilient and lightweight block of material that allows resistive compression of said torso element frontal chest panel and is resilient as it reforms upon release of the compression, the compression being a simulated external cardiac compression; and
a disposable airway element having an open end and a closed end, said airway element being adapted to be positioned with its open end pulled through the mouth opening of said head element to allow ventilation into said airway element, the closed portion of said airway element being positionable inside the cavity of said torso element lateral to said compression element to exert a force between the frontal chest and back panel of said torso element, thereby causing the frontal chest panel to rise with each breath.

12. A CPR manikin comprising in combination:
a disposable airway element in the form of an elongated bag extending from an open end to a closed end;
a resilient compression element;
a head element adapted to be tilted forward and back, said head element consisting of a folded semi-rigid board held together with mechanical connectors and an open back section, the board having a front side with illustrative facial features and a mouth opening and a bottom panel that blocks said airway element when the head element is tilted forward and opens said airway element when the head element is tilted back, said disposable airway element open end being adapted to cover said mouth opening;
a torso element consisting of a folded semi-rigid board held together with mechanical connectors, said board forming a frontal chest panel, a back panel, a shoulder panel and two side panels, said panels defining a cavity being adapted to receive said airway element and said compression element therein, said compression element fitting between the frontal chest and back panel within the torso element cavity with interference and said airway element overlaying or underlying said compression element within the torso element cavity; and
a hollow neck element consisting of a folded semi-rigid board and including mechanical connectors joining said head element to said torso element, said neck element including illustrative features that represent a pulse groove, said hollow neck element being adapted to contain said airway element therein.

13. A manikin in accordance with claim 12, wherein said neck element is disposed with mechanical attachments fashioned from the board to connect to the shoulder panel of said torso element and to the bottom panel of said head element.

14. A manikin in accordance with claim 12, further comprising openings in said head element and said torso element wherein mechanical attachments of said neck element fasten.

15. A manikin in accordance with claim 14, wherein said compression element comprises a resilient block that deforms under compressive load and reforms on release of a compressive load, the increased density of the block as it compresses thereby increasing the necessary compression force to indicate that compression has reached an acceptable limit.

16. A manikin in accordance with claim 12, wherein said compression element comprises a resilient block that deforms under compressive load and reforms on release of a compressive load, the increased density of the block as it compresses thereby increasing the necessary compression force to indicate that compression has reached an acceptable limit.

17. A manikin in accordance with claim 12, wherein said folded semi-rigid board composed head element is disposed with mechanical attachments fashioned from the board to hold it in shape.

18. A manikin in accordance with claim 12, wherein the folded semi-rigid board composed torso element is disposed with mechanical attachments fashioned from the board to hold it in shape.

* * * * *